(12) United States Patent
Burg

(10) Patent No.: US 6,634,310 B2
(45) Date of Patent: Oct. 21, 2003

(54) HIGH EFFICIENCY HIGH SPEED SHIP

(76) Inventor: Donald E. Burg, 15840 SW. 84th Ave., Miami, FL (US) 33157

( * ) Notice: Subject to any disclaimer, the term of this patent is extended or adjusted under 35 U.S.C. 154(b) by 0 days.

(21) Appl. No.: 10/067,172

(22) Filed: Feb. 4, 2002

(65) Prior Publication Data

US 2003/0145776 A1 Aug. 7, 2003

(51) Int. Cl.⁷ .................................................. B63B 1/38
(52) U.S. Cl. ...................................... 114/67 A; 114/280
(58) Field of Search ................................. 114/274, 280, 114/282, 288, 289, 291, 61.1, 61.2, 67 A, 285, 286, 287

(56) References Cited

U.S. PATENT DOCUMENTS

| | | | | |
|---|---|---|---|---|
| 2,144,111 A | * | 1/1939 | Higgins | 114/285 |
| 2,218,264 A | * | 10/1940 | Luce | 114/285 |
| 2,832,304 A | * | 4/1958 | Elyosius et al. | 114/280 |
| 3,092,062 A | * | 6/1963 | Savitsky | 114/277 |
| 4,348,195 A | * | 9/1982 | Lantz | 114/291 |
| 4,665,853 A | * | 5/1987 | Gerdsen et al. | 114/274 |
| 4,909,175 A | * | 3/1990 | Arnseson | 114/285 |
| 5,570,650 A | * | 11/1996 | Harley | 114/289 |

FOREIGN PATENT DOCUMENTS

| | | | | |
|---|---|---|---|---|
| GB | 2 121 731 A | * | 1/1984 | |
| TW | 404918 A | * | 9/2000 | |

* cited by examiner

*Primary Examiner*—Sherman Basinger
(74) *Attorney, Agent, or Firm*—Robert J. Van Der Wall

(57) ABSTRACT

Presented is a high efficiency high-speed boat or ship that has multiple hulls. These multiple hulls can include recesses in their undersides that are supplied with pressurized air to form supporting air cushions. There is a support and stability adding hydrofoil disposed between two of the multi-hulls and one trimmable hydrofoil mounted to the transom in the preferred embodiment of the invention. There are water deflecting steps forward of recesses inset in one or more sides of the multi-hulls where such recesses are preferably above the sidehull chines.

18 Claims, 2 Drawing Sheets

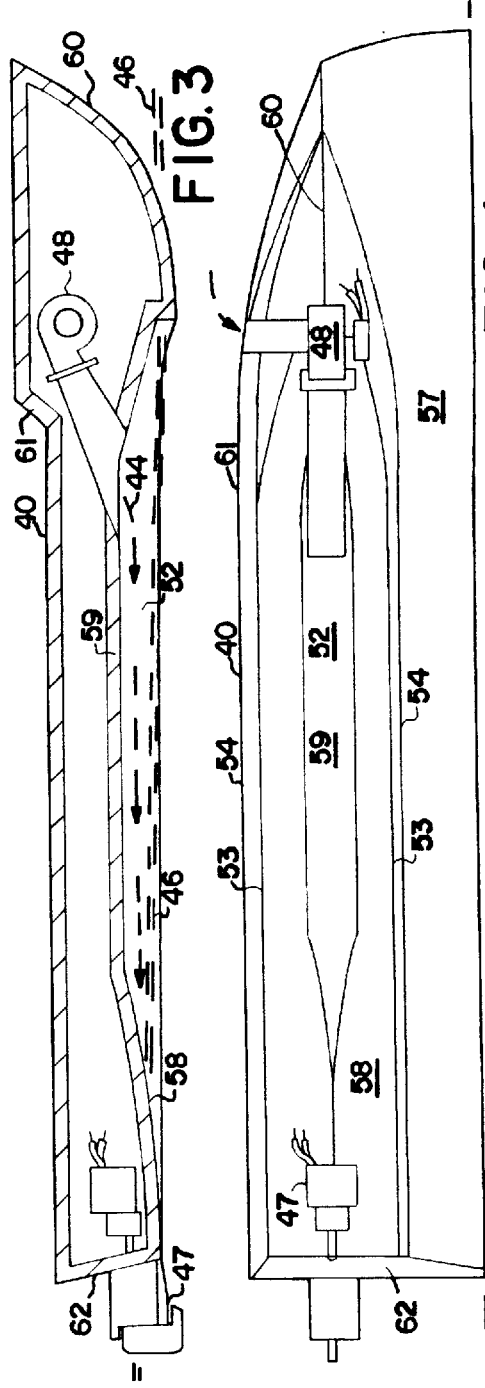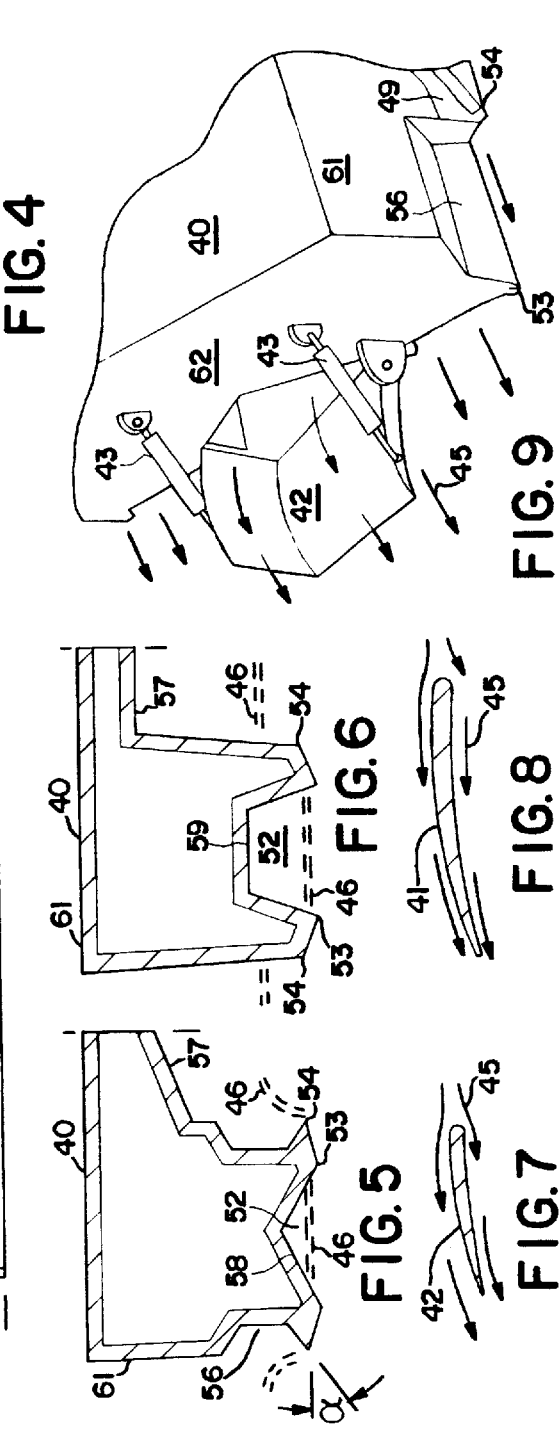

HIGH EFFICIENCY HIGH SPEED SHIP

BACKGROUND OF THE INVENTION

The instant invention presented here combines several inventive technologies to realize a high efficiency high speed boat or ship. It is a multi-hulled craft with artificially pressurized air cushions disposed in recesses in the undersides of at least two of the multi-hulls. An example of this air cushioned catamaran technology is presented in Applicant's earlier U.S. Pat. No. 5,839,384.

There is a support and stability adding hydrofoil disposed between two of the multi-hulls and one trimmable hydrofoil mounted to the transom in the preferred embodiment of the invention. There are water-deflecting steps inset into one or more sides of the multi-hulls where such steps are above the chines on the multi-hulls in the preferred embodiment. This approach differs from the water deflecting steps presented in Applicant's previously mentioned U.S. Pat. No. 5,839,384 where there are no chines below the steps.

SUMMARY OF THE INVENTION

A primary object of the instant invention is to provide an advanced high speed and high efficiency marine vehicle that has a trimmable hydrofoil disposed, at least in its majority, aft of transom portions of and above keels of two sidehulls of the improved multi-hulled marine vehicle.

A directly related object of the invention is that the trimmable hydrofoil span at least a majority of a distance between the sidehulls.

A further related object of the invention is that the trimmable hydrofoil be in mechanical communication with the transom portions and wherein force for movement of said hydrofoil is supplied by a powered actuator.

It is yet another object of the invention that the trimmable hydrofoil be angled rearward from its sides to its center.

A further object of the invention is that it include a second hydrofoil disposed between the sidehulls and forward of midship.

A directly related object of the invention is that said second hydrofoil be angled rearward from its sides to its center.

A further object of the invention is that there be an artificially pressurized gas cushion disposed in a recess under at least one of the multi-hulled marine vehicle's sidehulls.

Yet one more object of the invention is that it include at least one step cavity or recess inset into a side of one of the sidehulls.

A related object of the invention is that it include a water deflecting sidehull step disposed forward of the step recess.

Another object of the invention is that the step recesses be disposed above sidehull chines.

A further related object of the invention is that there be at least two water deflecting sidehull steps and at least two step recesses in the inboard and outboard sides of both sidehulls.

Another object of the invention is that the water deflecting steps be alternatively interspersed with step recesses inset into sides of the sidehulls.

A directly related object of the invention is that a portion of a step recess surface above the sidehull chine be angled inward and upward at an angle to horizontal of at least 35 degrees.

Yet another directly related object of the invention is that a portion of a step recess surface above the sidehull chine be angled inward and upward at an angle to horizontal of at least 50 degrees.

Still another directly related object of the invention is that a portion of a step recess surface above the sidehull chine be angled inward and upward at an angle to horizontal of at least 65 degrees.

BRIEF DESCRIPTION OF THE DRAWINGS

FIG. 3 is a cross section, as taken through line 3—3 of FIG. 2, that shows an air cushion recess and the blower that supplies pressurized air to thereby generate pressurized air cavity that supports a portion of boat weight.

FIG. 4 gives a half-breadth topside view taken with the deck covering removed so that the machinery arrangements may be seen.

FIG. 5 presents a half-breadth cross section, as taken through line 5—5 of FIG. 1, that shows a hull section in way of the cavities inset into both sides of the sidehull in this case. Note that a chine is disposed below the cavities and that the topside of the chine is angled downward to reduce the downforce when operating in heavy irregular seas that may alternatively fill the cavities with water.

FIG. 6 gives another half-breadth cross section, as taken though line 6—6 of FIG. 1, that shows the full shape of sidewalls in way of a water deflecting step.

FIG. 7 is a cross section, as taken through line 7—7 of FIG. 2, that shows a preferred shape and relative size of an aft mounted hydrofoil.

FIG. 8 presents a cross section, as taken though line 8—8 of FIG. 2, that gives the preferred shape and relative size of a forward mounted hydrofoil.

FIG. 9 gives a partial perspective view of the transom of the inventive boat hull showing an aft hydrofoil and its preferred means of attachment and actuation system. Note that the propulsor drives are deleted in this view for illustrative purposes only to simplify the drawing.

DETAILED DESCRIPTION

Figure 1:
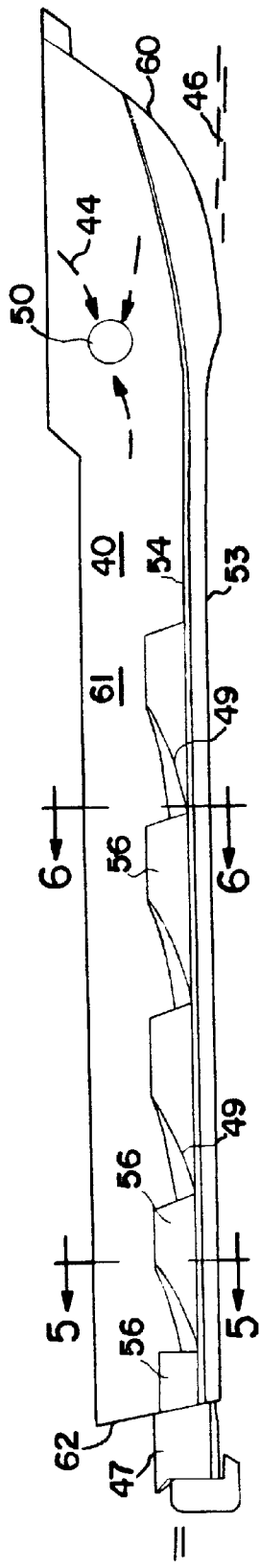
FIG. 1 presents a profile view of a boat or ship, hereinafter referred to as boat, showing the cavities inset in the sides of the hull, blower air inlet, and propulsor drive.

FIG. 1 presents a profile view of the inventive boat 40 showing the blower air inlet 50, airflow arrows 44, propulsor 47, waterline 46, sidehull keel 53, and sidehull bow 60.

Note that the water deflecting steps 49 deflect water away from the step cavities 56 that are inset into the sides of the sidehull 61 above the chines 54. This is important since, especially in heavy seas and/or when the boat is heavily loaded, water tends to stick to the sides of the hull above the chines 54 which adds a tremendous amount of wetted area drag. The concept here is to have the chines 54 deflect the water away from the hull entirely during calm sea high speed and/or light ship operations. As the vessel becomes heavily loaded and/or the sea states increase, there is little chance of having the chines deflect the water away from the hull entirely and so the reason for the step cavities 56. It is also important to note that the shape of the hull in way of the step cavities 56 must angle outward and downward to decrease the downward force when heavy and irregular seas are encountered. Their preferred shape can be best visualized upon examination of FIG. 5. It is also to be noted that in the case of larger vessels the water will override the chines even in calm seas at some point along the vessel's length. In such case, the same basic approach to the water deflecting steps and the step cavities may be used; however, it is possible to apply a rounded chine, not shown, rather than the rather sharp chine shown in the figures given here. The rounded chines are considered within the scope of the instant invention as they are a minor design adaptation only.

Figure 2:
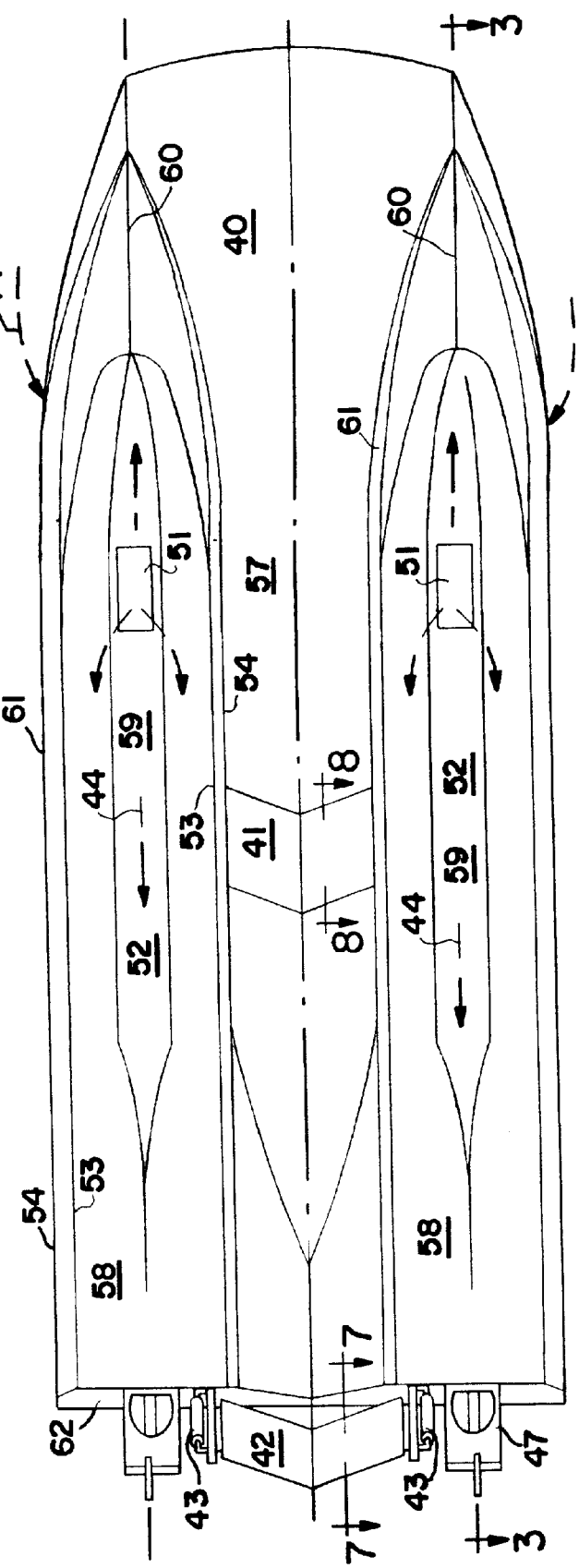
FIG. 2 is a bottom plan view of the boat of FIG. 1. This shows the preferred embodiment fixed hydrofoil near midship and a trimmable hydrofoil mounted to the transom. Note the hydrofoils are angled backward toward their centers here. While this angling is optional, the angling of the hydrofoils increases the speed at which cavitation inception on the hydrofoils begins.

FIG. 2 gives a bottom plan view of the instant invention inventive boat 40. Shown are pressurizing blower air discharges 51 in sidehulls 61, wetdeck 57 that connects the sidehulls 61, air cushion recesses 59, air cushions 52, air cushion recess aft seals 58, forward hydrofoil 41, aft hydrofoil 42, and aft hydrofoil actuators 43. The aft hydrofoil 42 is transom mounted in this preferred embodiment of the instant invention. Note that both hydrofoils 41, 42 are angled backward toward their centers here which, while not necessary, increase the speed at which hydrofoil cavitation occurs.

FIG. 3 is a cross section, as taken through line 3—3 of FIG. 2 that shows a centerline view of a sidehull 61. This illustrates a preferred shape of an air cushion recess 59 in the sidehull 61, blower 48 that supplies pressurized air or gas to the air cushion 52 where the bottom of the air cushion 52 is defined by waterline 46 in way of the air cushion recess 59, and preferred shape of the air cushion recess stern seal 58.

FIG. 4 presents a half-breadth topside arrangement, taken with the deck covering removed for illustrative purposes, that shows the blower 48 and drive propulsor 47 placements.

FIG. 5 gives a half-breadth cross section, as taken through line 5—5 of FIG. 1, that shows the preferred embodiment and shapes of the air cushion stem seal 58, step cavity 56, sidehull keels 53, and of the chine 54 at this transverse station of the hull. It is important to realize that the preferred shape of the hull above the chine 54 here is to be angled upward at a low resistance angle. For purposes of this application, the angle ($\alpha$) is set as preferably being between 35 and 75 degrees with 55 degrees felt to be optimum.

FIG. 6 presents a half-breath cross section, as taken through line 6—6 of FIG. 1, that indicates a preferred air cushion recess 59, keel 53, and chine 54 shape in way of one of the water deflecting steps forward of the a step cavity. Note the waterline 46 here which is the dynamic waterline inside of the air cushion recess when operating in calm seas with the air cushion 52 pressurized.

FIG. 7 gives a preferred relative size and cross section shape, as taken through line 7—7 of FIG. 2, of an aft hydrofoil 42. Water flow arrows 45 are also shown.

FIG. 8 presents a preferred relative size and cross section shape, as taken through line 8—8 of FIG. 2, of a forward hydrofoil 41.

FIG. 9 offers a partial perspective view of the transom 62 that shows a preferred embodiment mounting of an aft hydrofoil 42. The aft hydrofoil 42 is attached on each side to the transom portion of a sidehull 61 and is preferably above sidehull keels. This simple mounting approach keeps the attachment points and the actuators 43, hydraulic cylinders in this instance, free of contact with water passing between the sidehulls 61 resulting a reduced drag situation.

While the invention has been described in connection with a preferred and several alternative embodiments, it will be understood that there is no intention to thereby limit the invention. On the contrary, there is intended to be covered all alternatives, modifications, and equivalents as may be included within the spirit and scope of the invention as defined by the appended claims, which are the sole definition of the invention.

What I claim is:

1. In an improved multi-hulled marine vehicle having two sidehulls, the improvement comprising:
   a trimmable submerged hydrofoil of, as seen in a vertical longitudinal plane of the improved multi-hulled marine vehicle, low water resistance airfoil shape and disposed, at least in its majority, aft of transom portions of and above keels of the two sidehulls of said improved multi-hulled marine vehicle where said sidehulls are separated over at least a majority of their length by a waterline, said trimmable hydrofoil spans a distance between the sidehulls, wherein said trimmable hydrofoil is in mechanical communication with the transom portions, and wherein force for movement of said trimmable hydrofoil is supplied by a powered actuator and which further comprises artificially pressurized gas cushions disposed in undersides of each of the two sidehulls.

2. The multi-hulled marine vehicle of claim 1 wherein said trimmable hydrofoil is angled rearward from its sides to its center.

3. The improved multi-hulled marine vehicle of claim 1 which further comprises a second hydrofoil disposed, at least in its majority, forward of midship.

4. The improved multi-hulled marine vehicle of claim 3 wherein said second hydrofoil is angled rearward from its sides to its center.

5. The improved multi-hulled marine vehicle of claim 1 which further comprises at least one step recess inset into a side of one of the sidehulls.

6. The improved multi-hulled marine vehicle of claim 5 wherein a water deflecting sidehull step is disposed forward of the step recess.

7. The improved multi-hulled marine vehicle of claim 6 wherein there are at least two water deflecting sidehull steps and at least two step recesses in the inboard and outboard sides of both sidehulls.

8. The improved multi-hulled marine vehicle of claim 6 wherein the step recess is disposed above a sidehull chine.

9. The improved multi-hulled marine vehicle of claim 8 wherein a portion of a step recess surface above the sidehull chine is angled inward and upward at an angle to horizontal of at least 35 degrees.

10. The improved multi-hulled marine vehicle of claim 8 wherein a portion of a step recess surface above the sidehull chine is angled inward and upward at an angle to horizontal of at least 50 degrees.

11. The improved multi-hulled marine vehicle of claim 8 wherein a portion of a step recess surface above the sidehull chine is angled inward and upward at an angle to horizontal of at least 65 degrees.

12. In an improved multi-hulled marine vehicle having two sidehulls, the improvement comprising:
   artificially pressurized gas cushions disposed in the undersides of each of the two sidehulls of the multi-hulled marine vehicle, water deflecting steps alternatively interspersed with step recesses inset into outboard sides of each of the two sidehulls of said multi-hulled marine vehicle and wherein the step recesses are disposed external to the artificially pressurized gas cushions and above continuous sidehull chines of the multi-hulled marine vehicle.

13. The improved multi-hulled marine vehicle of claim 12 wherein said water deflecting steps and step recesses are disposed in both inboard and outboard sides of both sidehulls.

14. The improved multi-hulled marine vehicle of claim 12 wherein a portion of a step recess surface above the sidehull chine is angled inward and upward at an angle to horizontal of at least 35 degrees.

15. The improved multi-hulled marine vehicle of claim 12 wherein a portion of a step recess surface above the sidehull chine is angled inward and upward at an angle to horizontal of at least 50 degrees.

16. The improved multi-hulled marine vehicle of claim 12 wherein a portion of the step recess surface above the sidehull chine is angled inward and upward at an angle to horizontal of at least 65 degrees.

17. The improved multi-hulled marine vehicle of claim 12 which further comprises a trimmable hydrofoil disposed proximal an aft portion of said multi-hulled marine vehicle.

18. The improved multi-hulled marine vehicle of claim 12 which further comprises a hydrofoil disposed, at least in its majority, forward of midship.

* * * * *